J. R. SAURAGE.
AUTOMOBILE SIGNAL.
APPLICATION FILED DEC. 6, 1918.
1,345,259.
Patented June 29, 1920.
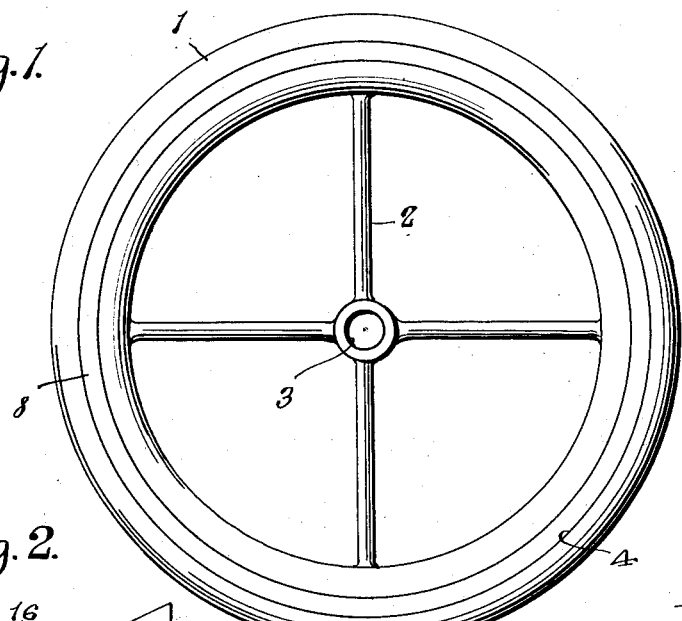
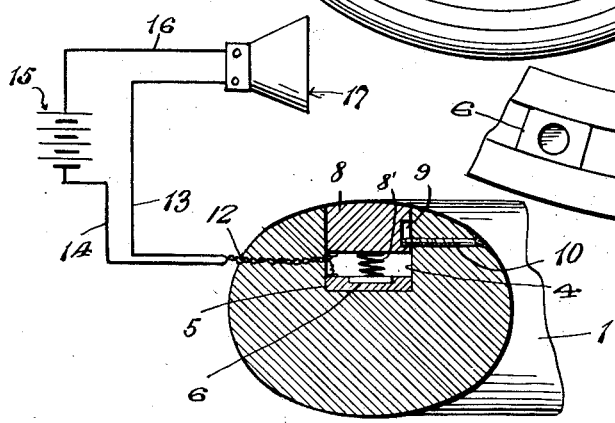
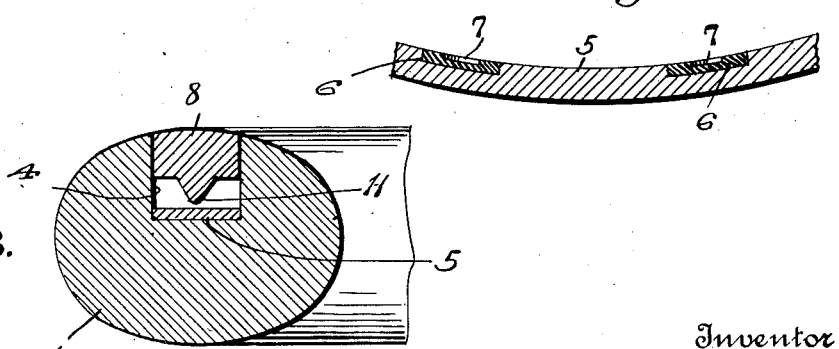
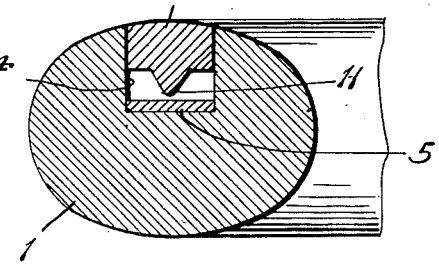
Inventor
J.R. Saurage.
By
Attorney

UNITED STATES PATENT OFFICE.

JAMES R. SAURAGE, OF BATON ROUGE, LOUISIANA.

AUTOMOBILE-SIGNAL.

1,345,259.  Specification of Letters Patent.  Patented June 29, 1920.

Application filed December 6, 1918. Serial No. 265,530.

*To all whom it may concern:*

Be it known that I, JAMES R. SAURAGE, a citizen of the United States, residing at Baton Rouge, in the parish of East Baton Rouge and State of Louisiana, have invented certain new and useful Improvements in Automobile-Signals; and I do hereby declare the following to be a full, clear, and exact description of the invention, such as will enable others skilled in the art to which it appertains to make and use the same.

This invention relates to improvements in automobile signals and more particularly to a circuit closer adapted for controlling the signal or alarm of the automobile and has for one of its objects the provision of a device of this character which forms a portion of the steering wheel so that the operator can sound the alarm or signal without removing the hands from the steering wheel.

Another object of this invention is the provision of means whereby the operator may actuate the alarm or signal from any point on the steering wheel with the fingers and which will not be affected during the ordinary gripping of the steering wheel while guiding the automobile.

A further object of this invention is the provision of an automobile signal of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a bottom plan view of a steering wheel illustrating my invention applied thereto, Fig. 2 is a transverse sectional view illustrating the manner of mounting a movable contact ring within the steering wheel, Fig. 3 is a similar view illustrating contact points upon the movable contact for engagement with the stationary contact, Fig. 4 is a fragmentary plan view illustrating insulating blocks carried by the stationary contact, Fig. 5 is a fragmentary sectional view of the same.

Referring in detail to the drawings, the numeral 1 indicates the rim of a steering wheel preferably constructed of wood and mounted upon the spokes 2 carried by the hub portion 3. The rim 1 on its bottom face has formed therein an annular groove 4 in which is secured a metallic band 5 forming a stationary contact provided with relatively spaced recesses to receive insulating blocks 6. The insulating blocks 6 have pockets 7 formed therein to receive coil spring 8' that movably support a flexible movable contact band 8 which is slidably mounted within the annular groove 4 of the rim 1 having its outer face flush with the outer face of the rim. The contact band 8 has formed therein slots 9 which receive the ends of screws or like fasteners carried by the rim 1 for limiting the inward and outward movement of the contact band 8. A plurality of contact projections 11 are formed upon the inner face of the movable contact band 8 and are adapted to engage the stationary contact band 5 when the movable contact band 8 is pressed inwardly by the fingers of the operator for completing an electrical circuit. The rim 1 is provided with an opening 12 to receive conductors 13 and 14. The conductor 13 has one end connected to the movable contact band 8 while the conductor 14 has one end connected to the stationary contact band 5. The other end of the conductor 14 is connected to a battery or other electrical source 15 which has connected thereto a conductor 16 connected to an alarm 17. The other end of the conductor 13 is connected to the alarm 17 so that upon moving the projections 11 of the movable contact band 8 into engagement with the stationary contact band 5 an electric circuit is completed to the alarm 17. By having the outer face of the movable contact band 8 flush with the face of the rim 1, prevents the same from being moved inwardly when the rim 1 is gripped in the usual manner while steering the wheel, making it necessary that the operator use his fingers to compress or move the movable contact band inwardly of the annular groove at any desired point.

While I have shown and described the preferred embodiment of my invention, it will be understood that minor changes in construction, combination and arrangement of parts may be made without departing from the spirit and scope of the invention as claimed.

What I claim is:—

A circuit closer comprising an annular member having an annular groove, a metallic band forming a stationary contact secured in said groove and disposed against the inner wall thereof and said band having spaced recesses therein, insulating blocks secured in said recesses and having pockets, a movable contact band located in the groove and having slots in one side wall thereof, pins secured to the annular member and extending into the slots for limiting the inward and outward movement of said movable contact band, springs seated in said pockets and bearing against the movable contact band, and projections formed on the movable contact band and adapted to engage the stationary contact band on the inward movement of said movable contact band.

In testimony whereof I affix my signature in presence of two witnesses.

JAMES R. SAURAGE.

Witnesses:
 JOE S. BRUNAH,
 L. S. BEALE.